O. KARCHER.
GRASS CLIPPER.
APPLICATION FILED MAR. 29, 1910.
1,032,485.
Patented July 16, 1912.
2 SHEETS—SHEET 1.
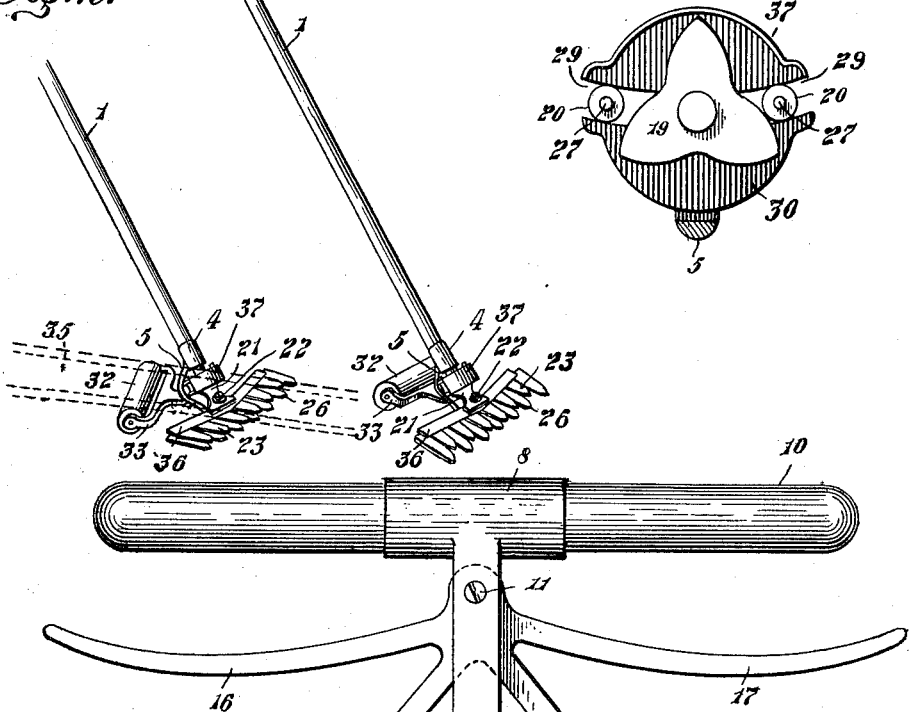
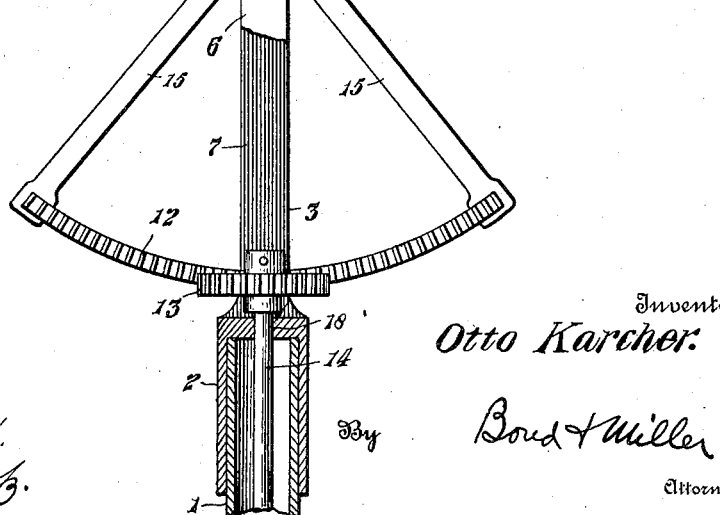
Witnesses
Sylvia Boron
H. H. Bishop
Inventor
Otto Karcher.
By Boyd & Miller
Attorneys O. KARCHER.
GRASS CLIPPER.
APPLICATION FILED MAR. 29, 1910.
1,032,485.
Patented July 16, 1912.
2 SHEETS—SHEET 2.
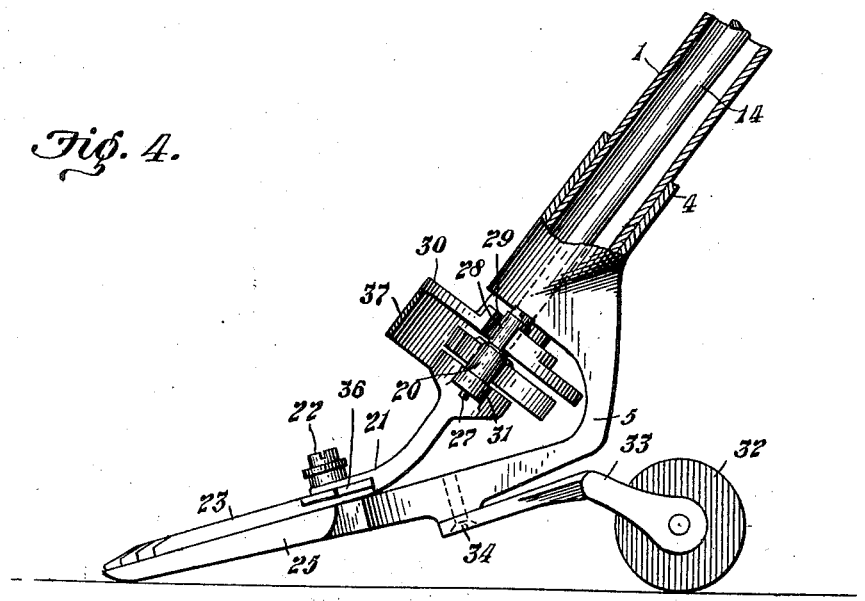
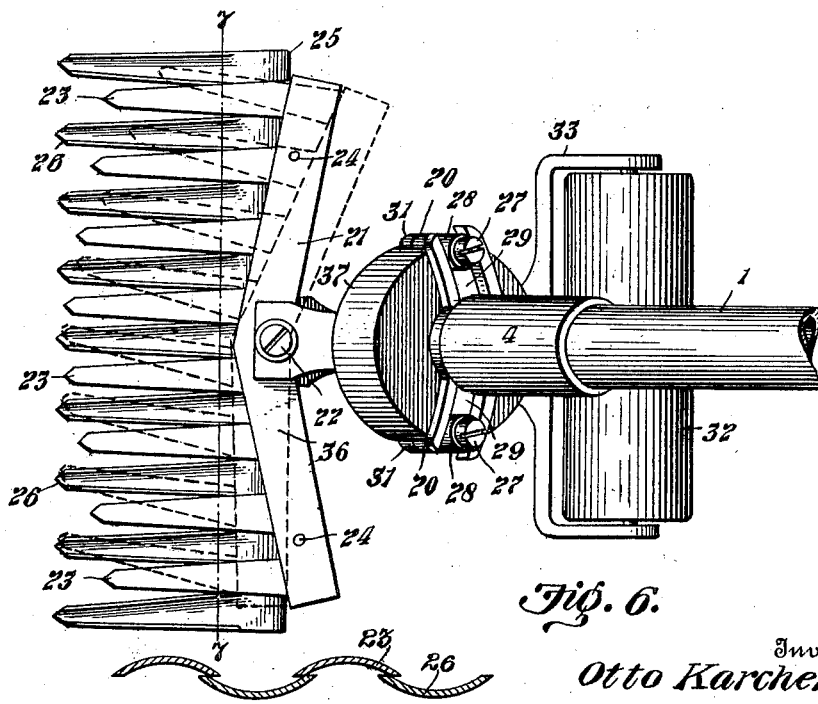
Inventor
Otto Karcher.
Witnesses
Sylvia Boron.
J. H. Bishop.
By Boud & Miller
Attorneys

UNITED STATES PATENT OFFICE.

OTTO KARCHER, OF CANTON, OHIO, ASSIGNOR, BY DIRECT AND MESNE ASSIGNMENTS, OF ONE-HALF TO WILLIAM VON GUNTEN, OF CANTON, OHIO.

GRASS-CLIPPER.

1,032,485. Specification of Letters Patent. Patented July 16, 1912.

Application filed March 29, 1910. Serial No. 552,242.

*To all whom it may concern:*

Be it known that I, OTTO KARCHER, a citizen of the United States, residing at Canton, in the county of Stark and State of Ohio, have invented certain new and useful Improvements in Grass-Clippers, of which the following is a specification.

My invention relates to new and useful improvements in grass clippers, and particularly to that type of grass clipper in which the cutting blades oscillate over the cutter bar.

The object of my invention is to provide a grass clipper or trimmer which is adapted for trimming the edges of lawns adjacent to fences, buildings, trees or shrubbery, and in other places practically inaccessible to the ordinary lawn-mower.

Another object is to provide a grass clipper which will be simple and of durable construction and which may be easily controlled by the operator so as to perform its work with certainty and precision.

These and other objects I attain by the mechanism illustrated in the accompanying drawings, in which—

Figure 1 is a perspective view of a grass clipper constructed in accordance with my invention. Fig. 2 is a view similar to Fig. 1 showing the cutting mechanism turned at an angle to the roller. Fig. 3 is an inverted plan view, with parts broken away, of the handles and the operating mechanism. Fig. 4 is a side elevation, partly in section, of the lower portion of the machine showing the cutting mechanism and the cam for operating the same. Fig. 5 is a lower or front end view of the cam and slotted disk showing the cam engaging rollers. Fig. 6 is a top plan view of the lower portion of the device. Fig. 7 is a cross-section on the line 7—7 of Fig. 6, showing however only four of the blades, on an enlarged scale.

Similar numerals of reference denote corresponding parts throughout the several figures of the drawings.

Referring now to the drawing the numeral 1, represents a tubular handle preferably of metal, the upper end of which is inserted in to the sleeve portion 2 of the casting 3, and the lower end of which is inserted into the sleeve 4 of the cutter bar carrying bracket 5. The casting 3 is bifurcated and the arms 6 and 7 thus formed are provided with the semi-cylindrical members 8 and 9 respectively, at their upper ends. The handle 10 is inserted between the semi-cylindrical members 8 and 9 and is securely clamped therein by means of the screw 11. The screw 11 also serves as a pivot for the segmental rack member 12, which meshes with the pinion 13 upon the upper end of the shaft 14. The rack member 12 is provided with the arms 15 and the handles 16 and 17. To rotate the pinion 13 the operator grasps the handle 10 with both hands and closes the fingers of his left and right hand over the handles 16 and 17 respectively. By holding the thumbs of each hand firmly against the rear portion of the handle 10 and alternately drawing his left and right fore-arms toward his body, the segmental rack 12 is caused to oscillate, thereby, rapidly rotating the pinion 13 and the shaft 14, first in one direction and then in the opposite direction. It should of course be understood that the operator may operate the device by merely squeezing the handles 16 and 17 toward the handle 10 by a movement of the fingers only. Also the device can be operated by means of only one of the handles 16 or 17 if desired. The upper end of the shaft 14 has a bearing at 18 in the member 3 and said shaft 14 is journaled near its lower end in the bracket 5. Upon the lower extremity of the shaft 14 is mounted the cam 19, which is adapted to engage the rollers 20 upon the rear end of the cutter blade carrying member 21 and cause said member 21 to be oscillated. The cam 19 is so constructed that one complete revolution of the same will cause three complete oscillations of the rear end of the member 21. The member 21 is pivoted to the bracket 5 at 22, and has the projecting cutter blades 23 secured thereto as at 24, said cutter blades being preferably concaved upon their lower faces. Upon the forward end of the bracket 5 is provided the lower cutter bar 25 having the projecting, spaced blades 26; said blades being slightly concaved upon their upper faces. The purpose of forming the blades concave upon their meeting or mutually adjacent faces will be quite apparent from an inspection of Fig. 7. And it will be seen that said blades when so formed are more readily sharpened, as the sharpening stone or other sharpening device may be applied in a plane, both cutting edges being ground in the same plane at the same time and producing an edge well adapted to retain the quality of sharpness for a long period of time. It will be noted that practically the only portion of the blades which mutually engage each other are the edges, and especially the ground portions thereof. The blades in their action will thus have a tendency to sharpen themselves when operated. In addition to this feature it will be understood that the concavity or curvature of the blades, especially if it be desired to construct the same from sheet metal will aid in strengthening the blades and keeping them in permanent alinement and proper position for operation.

Upon the spindles 27, above the rollers 20 are loosely mounted the rollers 28 adapted to reciprocate within the slots 29 formed in the disk 30. The spindles 27 are preferably threaded at their lower ends and are screwed into the ears 31 upon the member 21.

The device is carried upon the roller 32, which is mounted in the bifurcated member 33, the said bifurcated member being pivotally attached at its forward end to the bracket 5 as at 34 so that the cutting mechanism may be operated at any desired angle to the roller 32 as shown in Fig. 2 of the drawings. This construction is especially adapted to permit the cutter mechanism to be operated below the lower rails of fences or in similar inaccessible places.

Referring to Fig. 2 the dotted lines 35 represent the lower rail of a fence. With grass clippers of the ordinary construction it is very difficult if not impossible to trim the grass growing in such places as the clipper must necessarily be held at an angle to the fence so as to allow the cutting mechanism to extend beneath the rail thereof, and must be slid or dragged along by the operator. By my construction it is only necessary for the operator to set the device close to the fence and then by deflecting the cutting mechanism upon the pivot 34 the cutter bars are thrown beneath the rails of the fence and the handle portion of the device assumes a position at a sufficient distance from the fence to allow the operator to manipulate the device with ease, the roller 32 traveling along parallel to the fence.

It will be noted that the head or bar 36 of the blade carrying member 21 comprises two portions which are inclined at an obtuse angle to each other, the outer ends of said head being arranged somewhat back of the center thereof. As the cutting blades 23 on the head 36 are all of the same length the blades nearest the ends of the said head will not project as far forward as the lower cutting blades 26 when said head 36 is in the position intermediate the extremes of its oscillation. However in the operation of the device when either end of the head 36 is thrown to its forward limit the forward ends of the blade upon that portion of the head will be brought into alinement with the ends of the blades of the lower cutter bar as shown in dotted lines on Fig. 6. By this construction the upper blades 23 will at no time be thrown forward beyond the extremities of the lower blades 26 and it will be possible to operate the clipper closer to trees or shrubbery or the like without marring the same. To prevent grass and the like from becoming entangled with the cam 19 and rollers 20 a guard or casing is provided consisting of a semi-cylindrical flange 37 projecting downward from the upper half of the disk 30.

The operation of the device is as follows: As the shaft 14 is rotated alternately in one direction and the other by means of the pinion 13 and segmental rack bar 12, the cam 19 is rotated in the same manner. Said cam coming in contact with the rollers 20 mounted upon the rear end of the member 21 causes said member to be rapidly oscillated upon the pivotal point 22, the rollers 28 being reciprocated in the guide slots 29, which serves to maintain the member 21 in proper operative position with relation to the cam 19 and the lower cutter bar and blades 26. As the member 21 is oscillated the cutter blades carried by the head thereof are rapidly reciprocated over the cutting blades 26. The movement of the upper blades with reference to the lower blades is not of a merely transverse nature, there being a very considerable element of longitudinal movement combined with the transverse movement, thus producing a shearing effect well adapted to insure the satisfactory operation of the device.

Having fully described my invention, what I claim as new and desire to secure by Letters Patent, is—

1. A grass clipper comprising a cutter bar carrying bracket provided at its forward end with a lower cutter bar having projecting, spaced blades, a cutter blade carrying member pivoted to said bracket and provided with projecting, spaced blades overlying the blades of the lower cutter bar, said blade carrying member having an arm extending rearwardly from the point of pivotal connection, spaced rollers upon said arm, a handle mounted in said bracket and provided with a cam arranged to operate between and in engagement with said rollers, said bracket provided with guide slots, a second pair of rollers connected to said arm and adapted to reciprocate within said guide slots and means for rotating said cam.

2. In a device of the character described, mutually oscillating cutting members and means operatively connected to said members for actuating the same, said means comprising a handle, a segmental rack bar pivotally connected to said handle and having rack bar handles spaced from said first mentioned handle and adapted to be grasped, together with said handle, in the hands of the operator, and a pinion meshing with said rack bar, whereby the pinion may be operated by manually pressing said handle and rack bar handles together.

3. In a device of the character described, a fixed cutting member provided with projecting, spaced blades, an oscillating cutting member provided with projecting spaced blades and pivoted to said fixed member and means operatively connected to said cutting member for actuating the same, said means comprising a handle, segmental rack bars pivotally connected to said handle and having rack bar handles spaced from said first mentioned handle and adapted to be grasped, together with said handle in the hands of the operator, and a pinion meshing with said rack bar, whereby the pinion may be operated by manually pressing said handle and rack bar handles together.

4. A grass clipper comprising a cutter bar carrying bracket provided with projecting, spaced blades, a cutter blade carrying member pivoted to said bracket and provided with projecting, spaced blades overlying the blades of the lower cutter bar, said blade carrying member having an arm connected thereto, said arm provided with spaced rollers, a handle connected to said bracket and provided with a cam arranged to operate between and in engagement with said rollers, a disk connected to said bracket, said disk provided with guide slots, a second pair of rollers connected to said arm and adapted to reciprocate within said guide slots and means for rotating said cam.

5. A grass clipper comprising a cutter bar carrying bracket provided with forwardly projecting, spaced, fixed blades, an upper cutter blade carrying member pivoted to said bracket and provided with forwardly projecting, spaced, movable blades overlying the blades on the bracket, said movable blade carrying member having an arm extending rearwardly from the point of pivotal connection and provided with spaced rollers, a handle connected to said bracket and provided with a cam arranged to operate between and in engagement with said rollers, said bracket provided with roller guides, a second pair of rollers connected to said arm and adapted to reciprocate within said roller guides, a carrying roller pivotally attached to said bracket and adapted to roll upon the ground and means for rotating said cam.

6. In a grass clipper, a lower cutter bar, lower, forwardly projecting, spaced fixed blades connected to said bar and having their forward ends arranged practically in alinement, an upper blade carrying member pivotally connected to said lower cutter bar and provided with a blade carrying head having two portions arranged at an obtuse angle to each other, the outer ends of said head arranged somewhat back of the center thereof and back of the point of said pivotal connection, forwardly projecting, spaced, movable blades connected to said head, said blades all of substantially uniform length, the forward ends of said blades lying in lines forming an obtuse angle, the movable blades at the end of said head adapted to move forward to bring their forward ends into alinement with the ends of the fixed blades when said head is oscillated upon its pivotal connection and means for oscillating said head.

7. In a device of the character described oscillatory grass-clipping means, a handle, said grass clipping means attached to the lower end of said handle, two, fixed, oppositely extending grips connected to said handle at the upper end thereof, an oscillatory member provided with two, integral, oppositely extending oscillating grips, each oscillating grip being arranged adjacent but in spaced relation to one of said fixed grips, said oscillatory member pivotally connected to said handle intermediate said oscillating grips, the fixed and oscillating grips on the two sides of the handle adapted to be grasped in the respective two hands of the operator, each oscillating grip adapted to move away from its respective fixed grip when the other oscillating grip is moved toward its respective fixed grip, means operatively connecting said oscillatory member with said oscillatory grass-clipping means and adapted to oscillate said grass-clipping means when said oscillatory member is oscillated, whereby, by alternately manually pressing one and the other of said oscillating grips and their respective fixed grips together said clipping mechanism may be oscillated.

8. A grass clipper comprising a lower cutter bar having forwardly projecting, spaced, fixed blades connected thereto, said blades being concave upon their upper faces, an upper blade carrying member pivotally connected to said lower cutter bar, said member provided with forwardly projecting, spaced, movable blades, said movable blades formed concave upon their lower faces, the blades of the upper blade carrying member over-lying the blades of the lower cutter bar, said upper blade carrying member pivotally connected to said lower cutter bar and having an arm extending rearwardly from the point of pivotal connection, spaced rollers upon said arm, a handle connected to said lower cutter bar and provided with a cam arranged to operate between and in engagement with said rollers, a disk connected to said handle and provided with guide slots, a second pair of rollers connected to said arm and adapted to reciprocate within said guide slots and means for operating said cam.

In testimony that I claim the above, I have hereunto subscribed my name in the presence of two witnesses.

OTTO KARCHER.

Witnesses:
WILLIAM H. MILLER,
ATLEE POMERENE.

Copies of this patent may be obtained for five cents each, by addressing the "Commissioner of Patents, Washington, D. C."